United States Patent
McDaniel et al.

(12) 
(10) Patent No.: US 6,232,604 B1
(45) Date of Patent: May 15, 2001

(54) ANALOG TIME ADJUSTMENT FOR COINCIDENCE DETECTION ELECTRONICS

(75) Inventors: David L. McDaniel, Dousman; James E. Scarlett, Hartland, both of WI (US)

(73) Assignee: General Electric Company, Waukesha, WI (US)

( * ) Notice: Subject to any disclaimer, the term of this patent is extended or adjusted under 35 U.S.C. 154(b) by 0 days.

(21) Appl. No.: 09/187,170

(22) Filed: Nov. 6, 1998

(51) Int. Cl.[7] ............................. G01T 1/161; G01T 1/20
(52) U.S. Cl. ........................ 250/363.03; 250/363.04; 250/369
(58) Field of Search .................. 250/363.03, 363.04, 250/369

(56) References Cited

U.S. PATENT DOCUMENTS

| | | | |
|---|---|---|---|
| 5,241,181 | * | 8/1993 | Mertens et al. ............... 250/363.03 |
| 5,272,343 | * | 12/1993 | Stearns ............................. 250/363.03 |
| 5,272,344 | * | 12/1993 | Williams .......................... 250/363.03 |
| 5,300,782 | * | 4/1994 | Johnston et al. ................ 250/363.03 |
| 5,543,622 | * | 8/1996 | Stearns ............................. 250/363.03 |
| 5,625,190 | * | 4/1997 | Crandall .......................... 250/363.03 |
| 5,900,636 | * | 5/1999 | Nellemann et al. ............ 250/363.04 |
| 5,998,793 | * | 12/1999 | Shao et al. .......................... 250/369 |

\* cited by examiner

Primary Examiner—Constantine Hannaher
Assistant Examiner—Otilia Gabor
(74) Attorney, Agent, or Firm—Quarles & Brady, LLP; Christan G. Cabou (57) ABSTRACT

A method for correcting the temporal relationships between event detection pulses generated by a PET scanner system, the method including, for each pulse, identifying the impact point of an associated photon on a scanner surface area and based on the impact point, selecting a compensation delay for the pulse and delaying the pulse by the compensation delay. The invention also includes an apparatus for practicing the method.

22 Claims, 4 Drawing Sheets

ANALOG TIME ADJUSTMENT FOR COINCIDENCE DETECTION ELECTRONICS

BACKGROUND OF THE INVENTION

The present invention relates to PET scanners generally and specifically to a method and apparatus for modifying time stamps of detected photons to accurately mirror temporal relationships between photons which are detected despite hardware variations.

Positrons are positively charged electrons which are emitted by radionuclides which have been prepared using a cyclotron or other device. The radionuclides most often employed in diagnostic imaging are fluorine-18 ($^{18}$F), carbon-11 ($^{11}$C), nitrogen-13 ($^{13}$N), and oxygen-15 ($^{15}$O). Radionuclides are employed as radioactive tracers called "radiopharmaceuticals" by incorporating them into substances such as glucose or carbon dioxide. One common use for radiopharmaceuticals is in the medical imaging field.

To use a radiopharmaceutical in imaging, the radiopharmaceutical is injected into a patient and accumulates in an organ, vessel or the like, which is to be imaged. It is known that specific radiopharmaceuticals become concentrated within certain organs or, in the case of a vessel, that specific radiopharmeceuticals will not be absorbed by a vessel wall. The process of concentrating often involves processes such as glucose metabolism, fatty acid metabolism and protein synthesis. Hereinafter, in the interest of simplifying this explanation, an organ to be imaged will be referred to generally as an "organ of interest" and prior art and the invention will be described with respect to a hypothetical organ of interest.

After a radiopharmaceutical becomes concentrated within an organ of interest and while the radionuclides decay, the radionuclides emit positrons. The positrons travel a very short distance before they encounter an electron and, when the positron encounters an electron, the positron is annihilated and converted into two photons, or gamma rays. This annihilation event is characterized by two features which are pertinent to medical imaging and particularly to medical imaging using photon emission tomography (PET). First, each gamma ray has an energy of essentially 511 keV upon annihilation. Second, the two gamma rays are directed in substantially opposite directions.

In PET imaging, if the general locations of annihilations can be identified in three dimensions, the shape of an organ of interest can be reconstructed for observation. To detect annihilation locations, a PET scanner is employed. An exemplary PET scanner includes a plurality of detector modules and a processor which, among other things, includes coincidence detection circuitry. An exemplary detector module includes six adjacent detector units. An exemplary detector unit includes an array of crystals (e.g. 36) and a plurality of photo-multiplier tubes (PMTs). The crystal array is located adjacent to the PMT detecting surfaces. When a photon impacts a crystal, the crystal generates light which is detected by the PMTs. The PMT signal intensities are combined and the combined signal is compared to a threshold (e.g. 100 keV). When the combined signal is above the threshold, an event detection pulse (EDP) is generated which is provided to the processor coincidence circuitry. Other hardware determines which crystal generated the light (i.e. absorbed the photon).

The coincidence circuitry identifies essentially simultaneous EDP pairs which correspond to crystals which are generally on opposite sides of the imaging area. Thus, a simultaneous pulse pair indicates that an annihilation has occurred on a straight line between an associated pair of crystals. Over an acquisition period of a few minutes, millions of annihilations are recorded, each annihilation associated with a unique crystal pair. After an acquisition period, recorded annihilation data is used via any of several different well known procedures to construct a three dimensional image of the organ of interest.

Depending on its design a PET scanner may test the energy level before or after testing for coincidence timing and the coincidence timing test may be either analog or digital. In a typical analog coincidence circuit the duration of a timing signal is set to a pre-determined value (e.g. W/2 where W is a time period corresponding to a coincidence window). The timing signals from the detector units are then combined using a conventional AND logic gate which produces an output only when two timing pulses overlap (i.e. two consecutive pulses are within ±W/2).

In a typical digital coincidence circuit each timing signal is compared to a master clock signal in a time to digital converter (TDC). The time stamp digital value from the TDC corresponds to the time lapsed between the previous master clock pulse and the EDP. After each master clock cycle the time stamps of all photons detected during the completed master clock cycle (i.e. the stamps which occurred between the preceding two master clock pulses) are compared. Photons which have time stamp differences between the time stamps of smaller than ±W/2 are identified as coincidence pairs.

During an acquisition period there are several sources of annihilation detection error. Two of the more prominent sources of detection error are referred to as "dead time" and "randoms". The phenomenon known as dead time occurs when two photons impact a single crystal at essentially the same time (e.g. within the same time period W) so that the total absorbed energy far exceeds 511 keV or so that, while a first of the photons is being processed by the detector unit, a second of the photons is ignored by the unit. In these cases, at least one of the annihilations is not recognized and an error occurs.

The phenomenon known as randoms occurs when photons from two different annihilations are detected by two crystal at essentially the same time. For example, assuming two photons are detected at the same time from two different annihilations, the coincidence circuitry cannot determine which detection correspond to a first annihilation and which detection correspond to a second annihilation.

In order to minimize the number of random coincidences and the effects of deadtime, the size of the coincidence window W should be as small as feasibly possible. Unfortunately there are three sources of timing error which limit how small window W may be. First, because photons travel at the finite speed of light, photons produced at different locations within a scanner's field of view (FOV) reach crystals at different times. For example, if an annihilation event occurs eight inches from one crystal and sixteen inches from a second crystal it will take twice as long for a photon generated thereby to reach the second crystal than for a photon to reach the first crystal.

Second, the statistical nature of the photon detection process in a detector unit and electronic noise in scanner circuits cause variations among events detected by a detector unit.

Third, because there are slight differences in detector hardware the period between an impact time and an EDP can vary between detector units. In addition, even within a detector unit, the period between impact time and a corresponding EDP can vary as a function of where across a detector surface area a photon is absorbed.

While very little can be done to compensate for different flight times and noise, the industry has devised schemes to deal with varying hardware transit times. For example, according to one scheme the transit time differences among detector units are minimized by sorting the detector units so that detectors within each scanner have similar transit times.

According to another scheme, delay lines of selected values are added to the signal paths of certain detector units to even out the transit times. One way to select delay line values is to select delay line lengths known to cause specific delays.

Another way to select delay values is to provide a separate programmable delay for each detector unit. Prior to using the scanner to generate imaging data, a calibration procedure is used to set each programmable delay to eliminate the transient time differences. Preferably, both hardware selection and programmable delays are used together to reduce the effects of disparate transit times.

In the digital embodiment, after delays are added to the EDPs to coarsely compensate for disparate detector unit transit times, each delayed EDP is time stamped via the TDC and master clock. Thereafter, to finely compensate for different transit times across a detector unit's surface area, the time stamp value from the TDC can be modified again as a function of where on the detector's surface area a photon was absorbed. The corrected EDP is then provided to the coincidence circuitry for comparison and pairing.

Unfortunately, this scheme to compensating for disparate transit times described above has a number of shortcomings. First, where a separate programmable delay line is provided for each detector unit, because a typical scanner includes a large number of detector units (e.g. 336), the required delay hardware is expensive and requires a large amount of power thereby adding appreciably to scanner costs generally.

Second, measuring the transit times for each detector unit and selecting detector units for a scanner which have very similar transit times and/or determining the programmable delays to add to EDPs for each detector unit are time intensive processes and therefore are relatively expensive.

Third, where scanner hardware is digital, correcting time stamps generated by a TDC to compensate for varying transit times across a detector unit's surface area requires additional hardware and reduces coincidence detection efficiency. Efficiency is reduced because only events which occur in the same master clock cycle are compared by the coincidence circuitry. Where the event timing differences are not corrected before time stamps are generated, the probability of two gamma rays of a coincidence event being assigned to different master clock cycles increases and the coincidence detection efficiency between the two units decreases.

SUMMARY OF THE INVENTION

An exemplary embodiment of the inventive method, is used with a PET scanner which includes a scanner surface area and processing circuitry. When a photon impacts the scanner surface area at an impact point and at an event time, the scanner generates an event detection pulse (EDP). Scanner hardware which processes impacting photons causes varying delays between event times and corresponding EDPs. The method modifies the EDPs so that EDP timing is essentially temporally accurate relative to all other EDP times. To this end, the method comprises the steps of, for each EDP, identifying an impact point on the scanner surface area, selecting a compensation factor as a function of the impact point and modifying the EDP as a function of the compensation factor.

The scanner may include a plurality of detector units, each unit including a plurality of crystals, and the impact point may be identified by determining which detector unit, crystal, or both, detect an impacting photon. The invention also includes an apparatus for performing the inventive method and a program for performing the method.

The inventive method and apparatus have a number of advantages over the prior art. By selecting compensation delays as a function of scanner impact point, the number of hardware delays required to correct EDP times can be substantially reduced. In addition, by facilitating compensation which depends on detecting crystal as well as detecting detector unit, more precise EDP correction can be provided. Moreover, because precise EDP compensation can be provided prior to assigning a time stamp to the EDP, the likelihood of related time stamps being binned into different master clock cycles is substantially reduced. Other features and advantages of the invention will become apparent from the description which follows.

DESCRIPTION OF THE PREFERRED EMBODIMENT

Referring now to the drawings, wherein like reference characters and symbols represent corresponding elements and signals throughout the several views, and more specifically referring to FIG. 1, the present invention will be described in the context of an exemplary PET scanner system 8. System 8 includes an acquisition system 10, an operator work station 15, acquisition, locator and coincidence (ALC) circuitry 30 and an image reconstruction processor 40.

System 10 includes a gantry 9 which supports a detector ring assembly 11 about a central bore which defines an imaging area 12. A patient table (not illustrated) is positioned in front of gantry 9 and is aligned with imaging area 12. A patient table controller (not shown) moves a table bed into imaging area 12 in response to commands received from work station 15 through a serial communications link 18.

A gantry controller 17 is mounted within gantry 9 and is responsive to commands received from operator work station 15 through link 18 to operate gantry 9. For example, gantry 9 can be tilted away from vertical on command from an operator, can perform a "transmission scan" with a calibrated radio nuclide source to acquire attenuation measurements, can perform a "coincidence timing calibration scan" to acquire corrective data, or can perform a normal "emission scan" in which positron annihilation events are counted.

Figure 2:
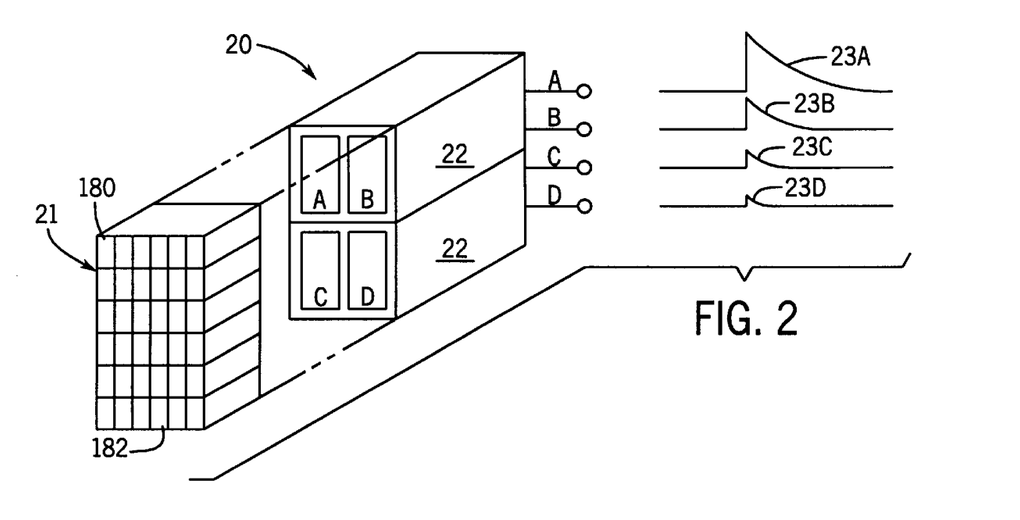
FIG. 2 is a perspective view of a detector unit and associated PMT signals.

As shown best in FIG. 2, assembly 11 is comprised of a large number of detector units 20. Although not illustrated, detector units 20 are arranged in modules, each module including six separate and adjacent detector units 20. A typical assembly 11 includes 56 separate modules such that each assembly 11 includes 336 separate detector units 20. Each unit 20 includes a set of bismuth germinate (BGO) scintillator crystals 21 arranged in a 6×6 matrix and disposed in front of four photo multiplier tubes (PMTs) A, B, C and D which are collectively referred to by numeral 22. When a photon impacts a crystal 21, a scintillation event occurs and the crystal generates light which is directed at PMTs 22. Each PMT 22 receives at least some light generated by the scintillation event and produces an analog signal 23A–23D which arises sharply when scintillation event occurs then tails off exponentially with a time constant of approximately 300 nanoseconds. The relative magnitudes of the analog signals 23A–23D are determined by the position in the 6×6 BGO matrix at which a scintillation event takes place, and the total magnitude of these signals is determined by the energy of a photon which causes the event.

Figure 1:
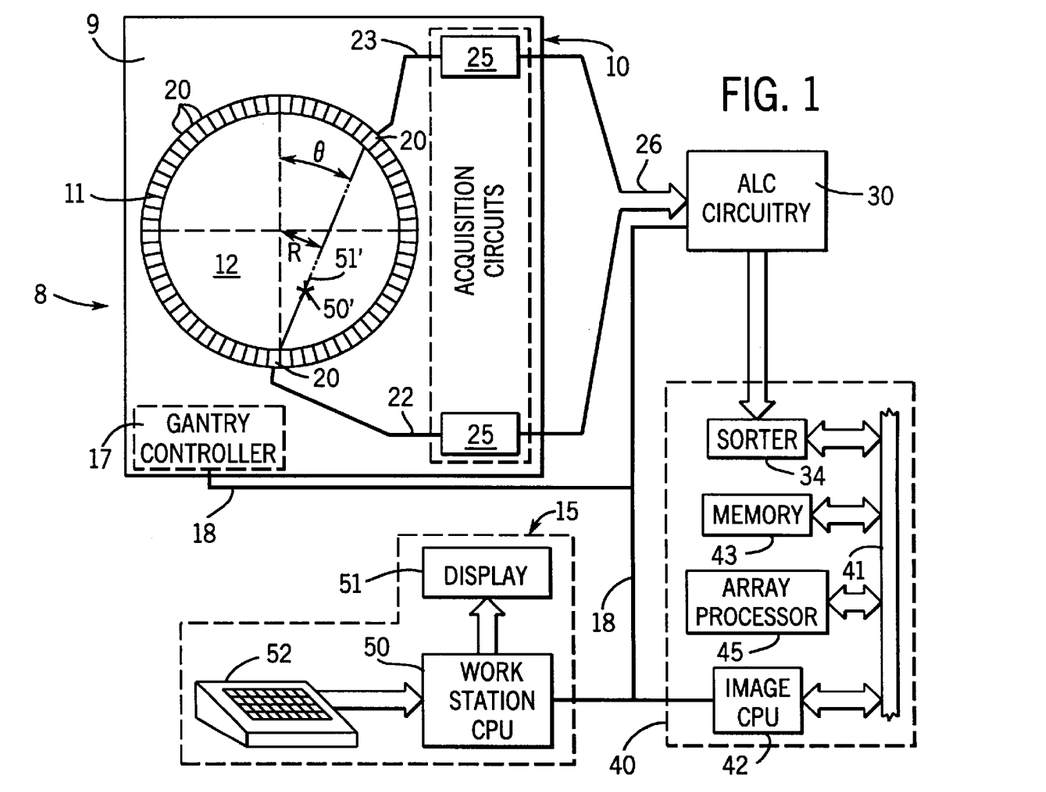
FIG. 1 is a schematic view of a PET system for implementing the present invention.

Referring still to FIGS. 1 and 2, a set of acquisition circuitry 25 is mounted within gantry 9 to receive the four signals 23A–23D from each detector unit 20 in assembly 11. Circuitry 25 provides signals 23A–23D to ALC circuitry 30 via a data bus 26. Circuitry 30 uses the signals 23A–23D to determine the energy of a detected event, if the energy detected likely corresponds to a photon, the actual coordinates of a detected event within the block of BGO crystals 21, the time of the event (i.e. generates a time stamp) and compares event times to select coincidence pairs of events which are stored as coincidence data packets. Each coincidence data packet includes a pair of digital numbers which precisely identify the addresses of the two BGO crystals 21 that detected an associated event. Operation of ALC circuitry 30 is explained more in detail below.

Referring to FIG. 1, processor 40 includes a sorter 34, a memory module 43, an array processor 45, an image CPU 42 and a backplane bus 41 which conforms to the VME standards and links all other processor components together. The primary purpose of sorter 34 is to generate memory addresses for the coincidence data packets to efficiently store coincidence data. The set of all projection rays that point in the same direction ( ) and pass through the scanner's FOV is a complete projection, or "view". A distance R between a particular projection ray and a center of the FOV locates that projection ray within the FOV. As shown in FIG. 1, for example, a positron annihilation (hereinafter an "event") 50' occurs along a projection ray 51' which is located in a view at the projection angle and the distance R. The sorter 34 counts all of the events which occur on this projection ray (R,θ) during an acquisition period by sorting out the coincidence data packets that indicate an event at the two BGO detector crystals lying on ray 51'.

During a data acquisition, the coincidence counts are organized in memory 43 as a set of two-dimensional arrays, one for each axial image, and each having as one of its dimensions the projection angle θ and the other dimension the distance R. This θ by R map of detected events is called a histogram. Coincidence events occur at random and sorter 34 quickly determines the θ and R values from the two crystal addresses in each coincidence data packet and increments the count of the corresponding sinogram array element. The values of θ and R may be calculated as follows:

$$\theta=(\phi_2+\phi_1)/2+90° \quad (1)$$

$$R=r_0 \cos [\phi_2-\phi_1)/2] \quad (2)$$

where
$\phi_1$=angular orientation of the first detector crystal;
$\phi_2$=angular orientation of the second detector crystal;
$r_0$=radius of detector ring.

At the completion of an acquisition period, memory 43 stores the total number of annihilation events which occurred along each ray (R, θ) in the histogram.

Image CPU 42 controls bus 41 and links processor 40 to local network 18. Array processor 45 also connects to the bus 41 and operates under the direction of image CPU 42 to facilitate image reconstruction using histogram data from memory module 43. The resulting image array is stored in memory module 43 and is output by image CPU 42 to operator work station 15.

Station 15 includes a CPU 50, a CRT display 51 and a keyboard 52. CPU 50 connects to network 18 and it scans the key board 52 for input information. Through the keyboard 52 and associated control panel switches, an operator can control calibration of the system 9, its configuration, and the positioning of patient table 13 during an acquisition period.

Figures 3, 4:
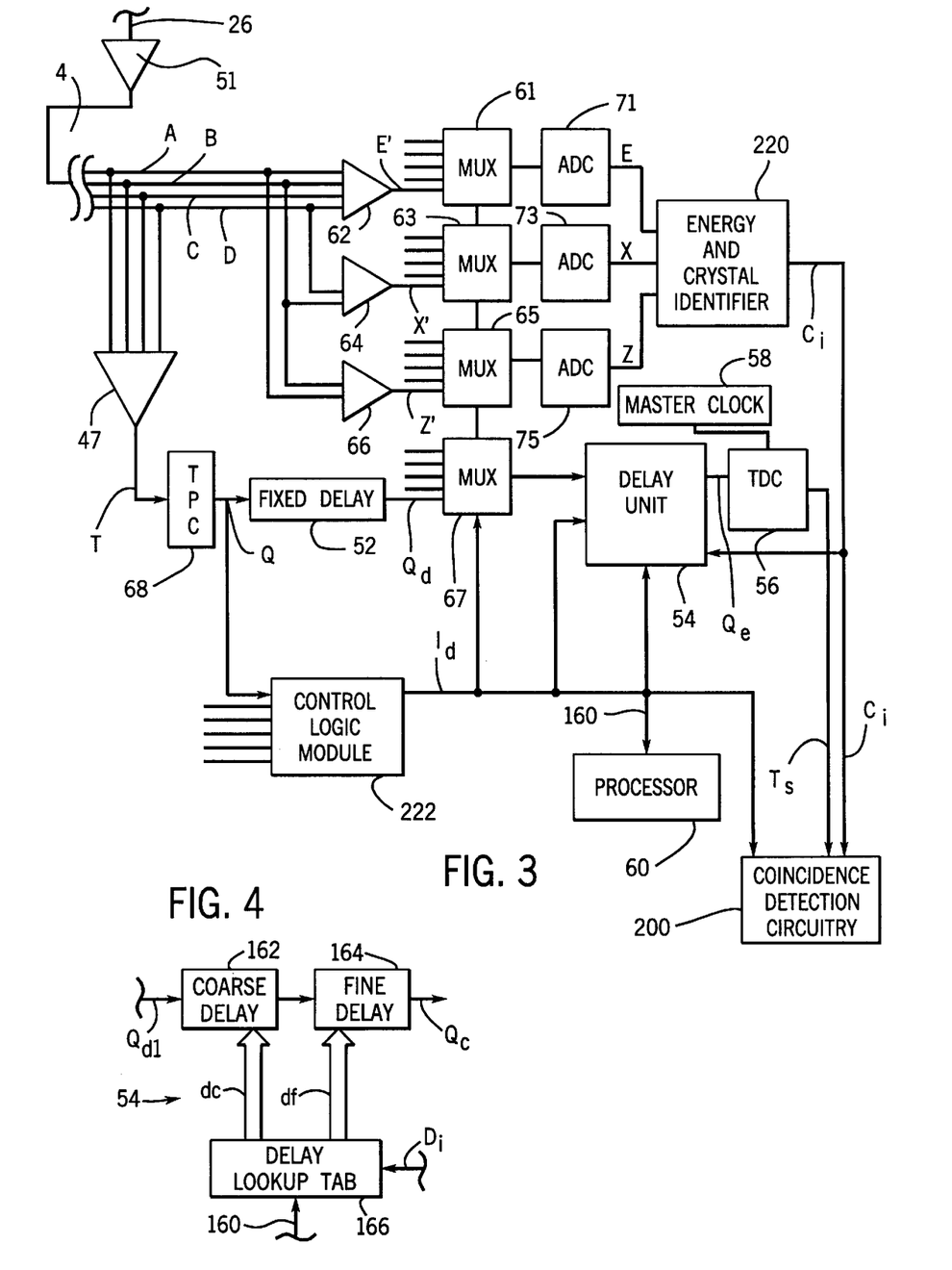
FIG. 3 is a schematic view of the ALC circuitry of FIG. 1.
FIG. 4 is a first embodiment of the delay unit of FIG. 3.

Referring to FIGS. 1, 2 and 3, for each separate detector module (i.e. grouping of six detector units 20) within an assembly 11, ALC circuitry 30 includes the hardware illustrated in FIG. 3. For each separate detector unit 20 within a module (which includes six detector units) the hardware includes four pre-amplifiers collectively referred to by numeral 51, first, second and third integrators 62, 64 and 66, respectively, a summer 47, a timing pick-off circuit (TPC) 68, and a fixed delay 52. In addition, for each detector module the hardware includes four multiplexers 61, 63, 65 and 67, three analog to digital converters 71, 73 and 75, an energy and crystal identifier 220, a delay unit 54, a time to digital converter (TDC) 56, a master clock 58, a processor 60, coincidence detection circuitry 200, a control logic module 222 and a plurality of buses and data lines linking the aforementioned components together.

Referring to FIGS. 2 and 3, a separate pre-amplifier 51 is provided for each PMT 22 in a detector unit 20. Each pre-amplifier 51 receives a separate one of the intensity signals 23A–23D (see FIG. 2) via a bus 26 and amplifies the intensity signal such that the resulting signal is at a suitable level for signal processing. The amplified signals corresponding to the four PMTs in each detector unit 20 are provided to summer 47 and integrator 62. Summer 47 sums the amplified signals generating a total energy signal T for detector unit 20, signal T provided to TPC 68.

TPC 68 compares received signal T to a threshold energy value which likely indicates an event occurrence (i.e. a scintillation event). The threshold energy level is typically 100 keV. When signal T exceeds the threshold energy level TPC 68 generates an event detection pulse (EDP) Q which is provided to fixed delay 52. Delay 52 delays EDP Q for a predetermined time and provides delayed EDP Qd to one of six inputs of multiplexer 67.

Module 222 receives the output of each TPC (i.e. a separate TPC for each detector unit in a module for a total of six outputs) and generates a detector unit identification signal Id indicating the detector unit which detected the scintillation event and generated the EDP Q. Signal Id is provided to each of multiplexers 61, 63, 65 and 67, to delay unit 54 and to coincidence detection circuitry 200. Signal Id controls which of six multiplexer input lines is linked to an associated multiplexer output line, a separate one of the input lines associated with each of the six detector units 20 (see FIG. 2) in a detector module.

Integrator 62 receives the amplified PMT signals (i.e. amplified signals 23A–23D) corresponding to an associated detector unit 20 and integrates those signals generating a integrated energy signal E' which is provided to one of six inputs to multiplexer 61.

Integrator 64 receives amplified signals from the right most PMTs in an associated detector unit 20. For example, referring again to FIG. 2, integrator 64 receives amplified signals 23B and 23D from PMTs B and D and integrates those signals to provide an X' signal indicative of a horizontal detector coordinate. Signal X' is provided to one of six inputs to multiplexer 63. Similarly, integrator 66 receives amplified signals from the upper most PMTs in an associated detector unit 20. In FIG. 2, integrator 64 receives amplified signals 23A and 23B from PMTs A and B and integrates those signals to provide a Z' signal indicative of a vertical detector coordinate. Signal Z' is provided to one of six inputs to multiplexer 65.

The outputs of the integrators 62, 64 and 66 and delay 52 which correspond to a specific detector unit 20 are all provided to similar multiplexer inputs. For example, if the output of an integrator 62 which is associated with a first detector unit 20 is provided to the first input of multiplexer 61, the outputs of integrators 64 and 66 and delay 52 which are associated with the first detector unit are also provided to the first inputs to multiplexers 63, 65 and 67, respectively. Outputs of integrators 62, 64 and 66 and delay 52 associated with a second detector unit 20 may all be provided to the second inputs of multiplexers 61, 63, 65 and 67, respectively, and so on. In this way data which corresponds to the same scintillation event is always transmitted via multiplexers 61, 63, 65 and 67 at the same time.

Multiplexer 61 provides its output to converter 71 which performs an analog to digital conversion on the received signal thereby generating a digital energy signal E. The output of multiplexer 61 is also provided to converters 73 and 75 along with the outputs of multiplexers 63 and 65, respectively. Converters 73 and 75 determine X and Z event coordinates within the block of BGO crystals 21 corresponding to the detector unit 20 by comparing the relative signal strengths as follows:

$$X=X/E \quad (3)$$

$$Z=Z/E \quad (4)$$

Thereafter, converters 73 and 75 generate digital coordinate signals X and Z, respectively. Each of signals E, X and Z are provided to identifier 220.

Identifier 220 first determines if integrated energy E is within an energy range which is known to be caused by a detected photon. Identifier 220 discards any detected events if the integrated energy E of the scintillation is outside the range of 511 keV±20%. For events which are not discarded, identifier 220 uses a lookup table to identify which of the 36 crystals 21 corresponds to the X and Z coordinates. The corresponding crystal is identified by a signal Ci which is provided to coincidence detection circuitry 200. In addition, in some embodiments of the invention signals Ci are also provided to delay unit 54 as will be explained in more detail below.

Delay unit 54 receives the delayed EDP Qd, the detector unit identification signal Id and perhaps the crystal identification signal Ci, and delays EDP Qd further as a function of either the detector unit identification signal Id or both the detector unit and crystal identification signals, thereby generating a corrected EDP Qc. Pulse Qc is provided to TDC 56 which also receives a master clock signal from clock 58. TDC 56 generates an 8-bit time stamp Ts corresponding to corrected EDP Qc and referenced from the most recent master clock signal and provides the time stamp Ts to circuitry 200. Time stamp Ts indicates within a matter of nanoseconds the precise time when a scintillation event occurred. Processor 60 controls unit 54 via data bus 160.

Coincidence detection circuitry 200 accepts the detector and crystal identifying signals Id and Ci and the associated time stamp Ts as an event data packet and determines if any two events are in coincidence. Coincidence is determined by a number of factors. First, the time stamps Ts in each event data packet must be within a small time window W/2 of each other, and second, the locations indicated by the two event data packets must lie on a straight line which passes through the FOV in imaging area 12 (see FIG. 1). Events which cannot be paired as coincidence events are discarded, but coincidence event pairs are provided to sorter 34 as coincidence data packets which are in turn stored in memory 43 (see FIG. 1).

Referring now to FIGS. 3 and 4, according to a first embodiment of the invention, delay unit 54 includes a coarse delay module 162, a fine delay module 164 and a delay lookup table 166. In this first embodiment table 166 receives only detector unit identification signal Id and, based on signal Id, processor 60 and table 166 cooperate to identify a suitable delay period for the detector unit indicated. For example, suitable delays may be 10 nanoseconds for a first detector unit, 8 nanoseconds for a second detector unit, 4 nanoseconds for a third detector unit and so on. Once a suitable delay has been selected, the delay is provided to modules 162 and 164 to delay EDP Qd accordingly.

In addition, each suitable delay is preferably split into two separate delays which are implemented in a pipeline fashion. The two delays including a coarse delay dc and a fine delay df. By splitting a delay into two separate delays deadtime errors can be reduced. For example, while first delay module 162 delays signal Qd according to coarse delay dc, fine delay df may be loaded into fine delay module 164 for subsequent modification of the signal. When the fine delay module 164 receives the delayed signal to implement the fine delay, the coarse delay module 162 can receive and modify the next EDP Qc provided by a linked multiplexer (see 67 in FIG. 3).

Thus, according to the first embodiment, table 166 uses identification signal Id to select suitable coarse and fine delays dc and df, respectively, and provides those delays to modules 162 and 164, respectively. Module 162 delays EDP Qd by the coarse delay and provides an output signal to module 164. Module 164 delays the received signal by the fine delay and provides the corrected EDP Qc to TDC 56.

Figure 5:
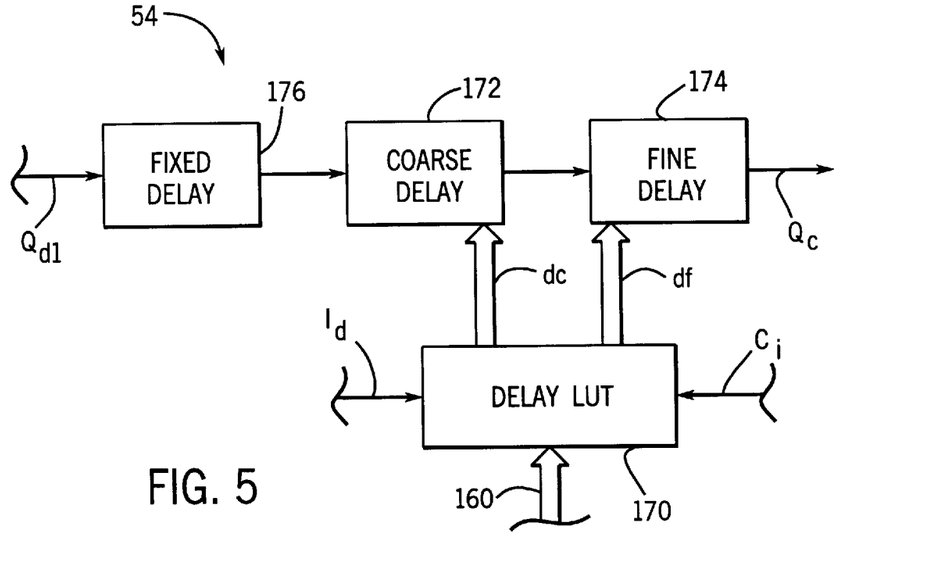
FIG. 5 is a second embodiment of the delay unit of FIG. 3.

Referring now to FIGS. 3 and 5, delay unit 54 according to a second embodiment of the invention is illustrated. Many of the components of this second embodiment are similar to the first embodiment and therefore will not be described again in detail. This embodiment is similar to the first embodiment in that this second embodiment includes a delay lookup table 170 which is controlled by processor 60 via bus 160, a coarse delay module 172 and a fine delay module 174. In addition, unit 54 also includes another fixed delay 176.

According to this second embodiment table 170 uses both the detector unit identification signal Id and the crystal identification signal Ci to select suitable coarse and fine delays for driving modules 172 and 174. Using both the crystal and detector unit signals, Ci and Id, time delays for specific event signals can be made even more accurate by making the signals dependent on where across a detector unit impact surface a scintillation event occurs. Thus, for example, referring again to FIG. 2, the transit time for an event signal generated by a scintillation in an upper left crystal 180 may be appreciably different than the transit time for an event signal generated by a scintillation in a lower right crystal 182.

Referring to FIG. 3, a finite time period is required for identifier 220 to identify a specific scintillation crystal Ci. Fixed delay 176 is provided to ensure that the EDP Qd does not reach modules 172 and 174 prior to provision of crystal identification signal Ci.

After delays dc and df are provided to modules 172 and 174, respectively, module 172 delays EDP Qd by the coarse delay dc and provides its output to module 174 which in turn delays the pulse by fine delay df providing corrected EDP Qc to TDC 56.

Figure 6:
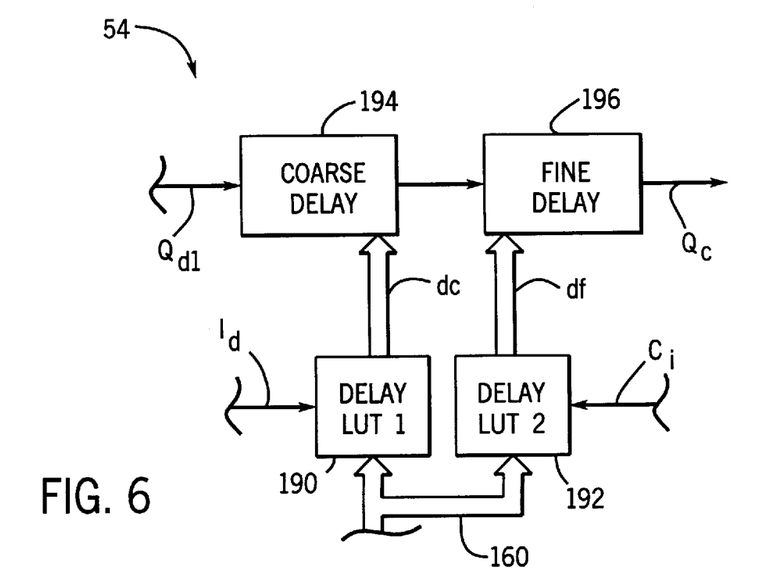
FIG. 6 is a third embodiment of the delay unit of FIG. 3.

Referring now to FIGS. 3 and 6, unit 54 according to a third embodiment of the invention is illustrated. In this third embodiment first and second lookup tables 190 and 192 are provided and both a coarse delay module and a fine delay module 194 and 196 are provided. Each of tables 190 and 192 is controlled by processor 60 via bus 160. Table 190 receives detector unit identification signal Id and uses that signal to select a suitable coarse delay dc which is provided to module 194. Module 194 also receives signal Qd1 and delays that signal by coarse delay dc providing its output to fine delay 196. Table 192 receives crystal identification signal Ci and uses that signal to select a suitable fine delay df which is provided to module 196. Module 196 receives the output from module 194 and delays that signal by the fine delay thereby generating corrected EDP Qc. Corrected EDP Qc is then provided to RDC 56.

Suitable delays for each crystal or each detector can be determined in any manner which is well known in the art and once the delays are determined the delays are provided in a lookup table for access during image data processing. For example, referring again to FIG. 1, according to one method of detecting delays a point source of radiation can be provided precisely in the center of imaging area 12. As photons are generated and scintillations occur in crystals, the time differences between crystals which detect coincidence events can be identified. Since photons travel equal distances to each of the two detectors in each coincidence pair, the EDPs generated by each crystal should indicate precisely the same times. Any difference in time, therefore, represents an error caused by different transit times in the detectors. The errors are then converted into delays which are used to populate lookup tables for use with the present invention.

In the interest of simplifying this explanation operation of the inventive delay apparatus and method will be described with reference to the third preferred embodiment described above and with reference to FIGS. 1, 2, 3 and 6. Operation of the first and second embodiments should be easily understood from the description above and the example which follows.

Referring to FIGS. 1, 2, 3 and 6 and in operation, assuming suitable delay tables have been provided in lookup tables 190 and 192, when an annihilation event occurs within imaging area 12 so that first and second photons head in opposite directions toward ring assembly 11, each photon impacts a separate one of the crystals 21 and scintillation events occur. Each event is detected by each of the four PMTs 22 in an associated detector unit 20 and four signals 23A through 23D are generated for each photon.

Figure 7:
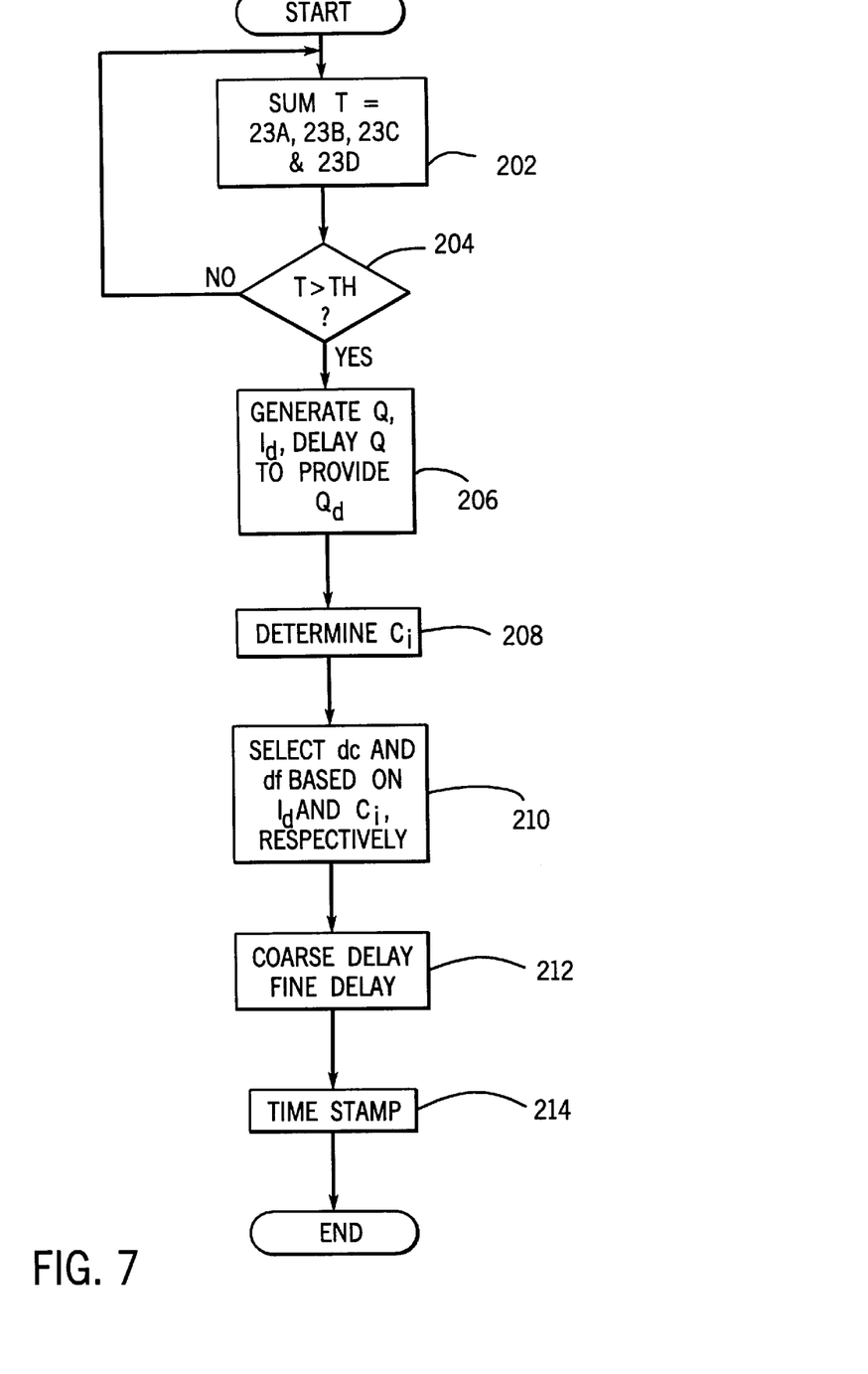
FIG. 7 is a is a flow chart illustrating an inventive method performed by the hardware of FIGS. 1, 2, 3 and 6.

Referring to FIG. 3, each signal 23A through 23D is amplified and the amplified signals are provided to summer 47 and integrators 62, 64 and 66 as indicated above. Referring also to FIG. 7 at block 202 summer 47 adds the signals 23A–23D and provides a total energy signal T to TPC 68. At block 204, when total signal T exceeds a threshold range Th, TPC 68 generates an event detection pulse EDP Q at block 206 and generates an identification pulse Id. Also at block 206 EDP Q is delayed by delay 52 and then provided to multiplexer 67 as delayed EDP Qd. Identification signal Id is provided to multiplexers 61, 63, 65 and 67 and thereby links multiplexer inputs which correspond to the detector unit associated with identification signal Id to the multiplexer outputs.

Integrators 62, 64 and 66 generate signals E', X' and Z' which are converted to digital signals E, X and Z, respectively. Signals E, X and Z are provided to identifier 220. Referring to FIG. 2 and FIG. 7, at block 208, identifier 220 determines in which crystal 21 the scintillation event occurred generating identification signal Ci. Delayed EDP Qd, identification signal Id and crystal identification signal Ci are all received by unit 54. Referring to FIG. 6, at block 210, Tables 190 and 192 select both coarse delay dc and fine delay df based on signals Id and Ci, respectively. At block 212, coarse delay module 194 and fine delay module 196 delay EDP Qd and provide corrected EDP Qc to TDC 56. TDC 56 time stamps EDP Qc at block 214.

While the invention is described as used with a ring-type scanner, the invention is also meant to be used with PET scanners having other configurations such as opposed flat surface scanners. In addition, while it is preferred that compensation factors be delays, in fact compensation could be through expediting EDP's or a combination of delays and expedition, the important result being relative temporal accuracy between EDPs.

What is claimed is:

1. A method to be used with a PET scanner which includes a plurality of detector units, each detector unit including a detection surface area, when a photon impacts a detection surface area at a detection point and an event time, the scanner generating an event detection pulse (EDP), scanner hardware which processes impacting photons causing varying delays between event times and corresponding EDPs, the detector delay corresponding to each detector unit varying as a function of detection point, the method for modifying the EDPs so that the timing of each EDP is essentially temporally accurate relative to all other EDPs, the method comprising the steps of:

for each EDP:
   identifying the detection point;
   selecting a compensation factor as a function of the detection point and the generating detector; and
   modifying the EDP as a function of the compensation factor.

2. The method of claim 1 wherein the compensation delay includes a coarse delay and a fine delay, the step of selecting includes selecting a coarse delay and a fine delay and the step of delaying the EDP includes first delaying the EDP by the coarse delay to generate a coarsely delayed EDP and then delaying the coarsely delayed EDP by the fine delay to generate a corrected EDP.

3. The method of claim 1 wherein each detector unit includes a plurality of crystals arrayed across the detector surface area, each crystal, when a photon is absorbed thereby at an event time, generating light which is sensed by other detector unit hardware, the other hardware generating the EDP, the step of determining a detection point including determining which crystal absorbed a photon, the step of selecting including selecting a compensation delay which corresponds to the generating detector unit and the absorbing crystal.

4. The method of claim 3 wherein the step of selecting includes selecting the coarse delay as a function of the generating detector unit and selecting the fine delay as a function of the absorbing crystal.

5. The method of claim 3 wherein the other detector unit hardware includes a plurality of photo-multiplier tubes (PMTs) and wherein, when light is generated by a crystal, the light is sensed by the PMTs which generate PMT signals and the method further includes the steps of, prior to identifying the impact point, identifying an EDP by summing PMT signals to generate a total energy signal, comparing the total energy signal to a threshold signal and, when the total energy signal exceeds the threshold signal, identifying an EDP.

6. An apparatus to be used with a PET scanner which includes processing circuitry and a plurality of detector units which, each detector unit including a detection surface area, when a photon impacts a detection surface area at a detection point and an event time, the scanner generating an event detection pulse (EDP), a scanner hardware which processes impacting photons causing varying delays between event times and corresponding EDPs, the detector delay corresponding to each detector unit varying as a function of detection point, the apparatus for modifying the EDPs so that the timing of each EDP is essentially temporally accurate relative to all other EDPs, the apparatus comprising:

a detection point identifier for identifying detection points;

a selector which selects a compensation factor as a function of the detection point and the generating detector; and a modifier which modifies the EDP as a function of the compensation factor.

7. The apparatus of claim 6 wherein the modifier includes both a coarse delay module and a fine delay module and the compensation delay includes a coarse delay and a fine delay, the selector selects both a coarse delay and a fine delay and the coarse delay module delays the event signal by the coarse delay to generate a coarsely delayed EDP and then the fine delay module delays the coarsely delayed EDP by the fine delay to generate a corrected EDP.

8. The apparatus of claim 6 wherein each detector unit includes a plurality of crystals arrayed across the detector surface area, each crystal, when a photon is absorbed thereby at an event time, generating light which is sensed by other detector unit hardware, the other hardware generating the EDP, the identifier determining a detection point by determining which crystal absorbed a photon, the selector selecting a compensation delay which corresponds to the generating detector unit and the absorbing crystal.

9. The apparatus of claim 8 wherein the selector selects the coarse delay as a function of the generating detector unit and selects the fine delay as a function of the absorbing crystal.

10. The apparatus of claim 8 wherein the other detector unit hardware includes a plurality of photo-multiplier tubes (PMTs) and wherein, when light is generated by a crystal, the light is sensed by the PMTs which generate PMT signals and the apparatus further includes, for each detector unit, a summer which sums the PMT signals to generate a total energy signal, a timing pick-off circuit for comparing the total energy signal to a threshold signal and, when the total energy signal exceeds the threshold signal, identifying an EDP.

11. The apparatus of claim 8 wherein the modifier includes both a coarse delay module and a fine delay module, the compensation delay includes a coarse delay and a fine delay and the coarse delay module delays the EDP by the coarse delay to generate a coarsely delayed EDP and then the fine delay module delays the coarsely delayed EDP by the fine delay to generate a corrected EDP.

12. A programmed data processor for use with a PET scanner system including processing circuitry, and a plurality of detector units, each detector unit including a detection surface area, when a photon impacts a detection surface area at a detection point and an event time, the scanner generating an event detection pulse (EDP), scanner hardware which processes impacting photons causing varying delays between event times and corresponding EDPs, the detector delay corresponding to each detector unit varying as a function of detection point, the processor for modifying the EDPs so that the timing of each EDP is essentially temporally accurate relative to all other EDPs, the processor performing the steps of:

for each EDP:
identifying detection point;
selecting a compensation factor as a function of the detection point and the generating detector; and
modifying the EDP as a function of the compensation factor.

13. The processor of claim 12 wherein the compensation delay includes a coarse delay and a fine delay, the step of selecting includes selecting a coarse delay and a fine delay and the step of delaying the EDP includes first delaying the EDP by the coarse delay to generate a coarsely delayed EDP and then delaying the coarsely delayed EDP by the fine delay to generate a corrected EDP.

14. The processor of claim 12 wherein each detector unit includes a plurality of crystals arrayed across the detector surface area, each crystal, when a photon is absorbed thereby at an event time, generating light which is sensed by other detector unit hardware, the other hardware generating the EDP, the step of determining a detection point including determining which crystal absorbed a photon, the step of selecting including selecting a compensation delay which corresponds to the generating detector unit and the absorbing crystal.

15. The processor of claim 14 wherein the step of selecting includes selecting the coarse delay as a function of the generating detector unit and selecting the fine delay as a function of the absorbing crystal.

16. The processor of claim 14 wherein the other detector unit hardware includes a plurality of photo-multiplier tubes (PMTs) and wherein, when light is generated by a crystal, the light is sensed by the PMTs which generate PMT signals and the processor further performing the steps of, prior to identifying the impact point, identifying an EDP by summing PMT signals to generate a total energy signal, comparing the total energy signal to a threshold signal and, when the total energy signal exceeds the threshold signal, identifying an EDP.

17. An apparatus to be used with a PET scanner that includes a plurality of detector modules, each detector module including at least two detector units that together form a surface area, when a photon impacts the surface area at an impact point and an event time, one of the detector units generating an event detection pulse (EDP), scanner hardware that processes impacting photons causing varying delay between event times and corresponding EDPs, the apparatus for modifying the EDPs so that the timing of each EDP is essentially accurate relative to all other EDPs, the apparatus comprising:

a timing pick-off circuit linked to the detector module for identifying the time of an EDP;

a detector unit identifier that identifies the detector unit that generates an EDP;

a multiplexer linked to the identifier and that includes a separate input for each of the detector units and a single output, the multiplexer passing the EDP to the output;

a delay unit linked to the multiplexer output and the identifier, the delay unit selecting a compensation delay as a function of the detector unit and delaying the EDP by the compensation delay to generate a delayed EDP.

18. The apparatus of claim 17 wherein each detector unit includes a plurality of absorbing crystals that form the surface area and wherein the apparatus further includes a crystal identifier for identifying the crystal within the detector unit that a photon impacts, the crystal identifier also linked to the delay unit, the delay unit selecting the compensation factor as a function of the detector unit and the impacted crystal.

19. The apparatus of claim 18 wherein the delay unit selects a compensation delay by selecting both a coarse delay and a fine delay and the delay unit delays the EDP by first delaying the EDP by the coarse delay and then delaying the EDP by the fine delay.

20. The apparatus of claim 19 wherein the delay unit selects the coarse delay as a function of the detector unit and selects the fine delay as a function of the crystal.

21. The apparatus of claim 18 wherein each detector unit includes 36 separate crystals.

22. The apparatus of claim 17 wherein the at least two detector units include six detector units.

* * * * *